United States Patent Office 3,676,032
Patented July 11, 1972

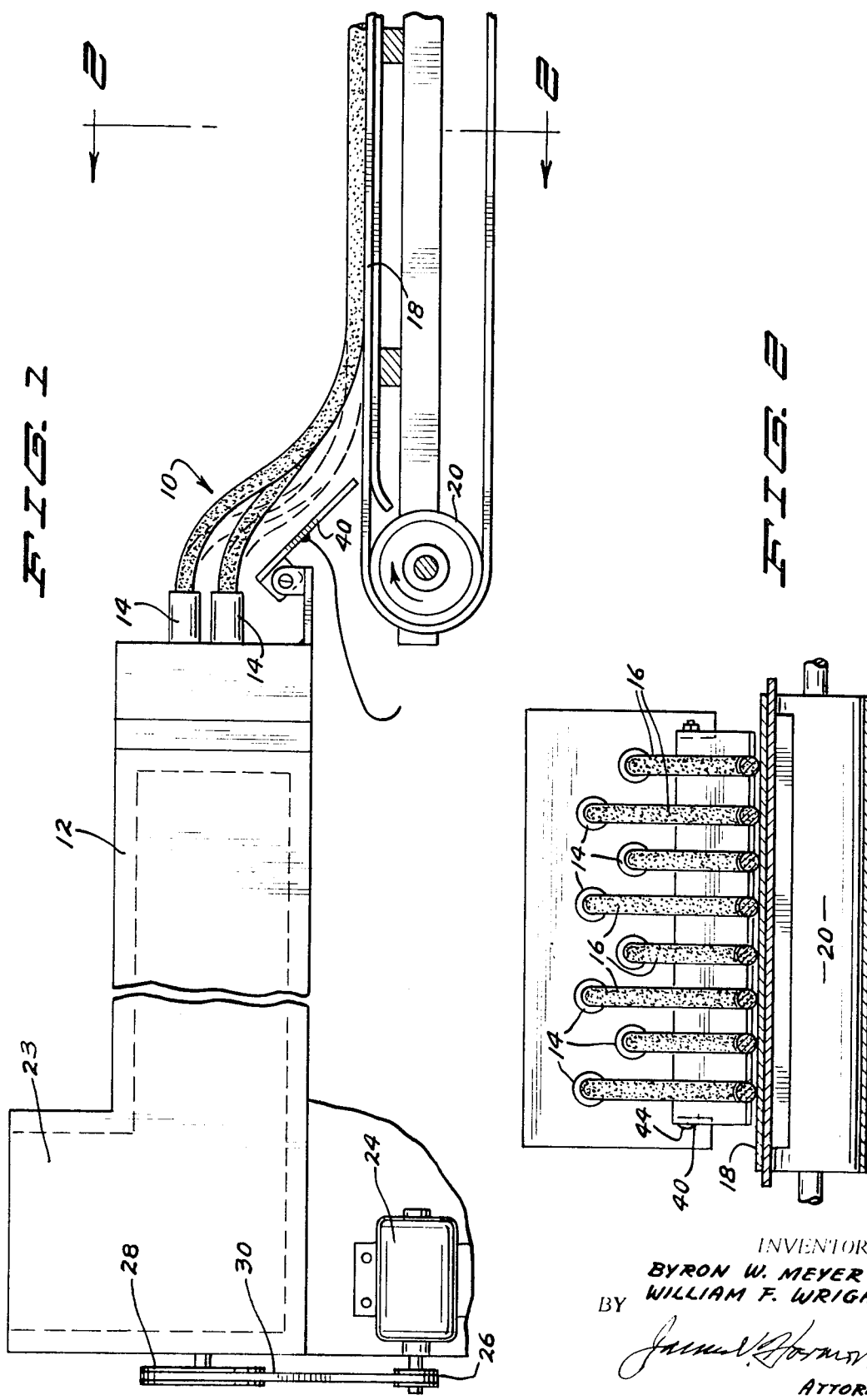

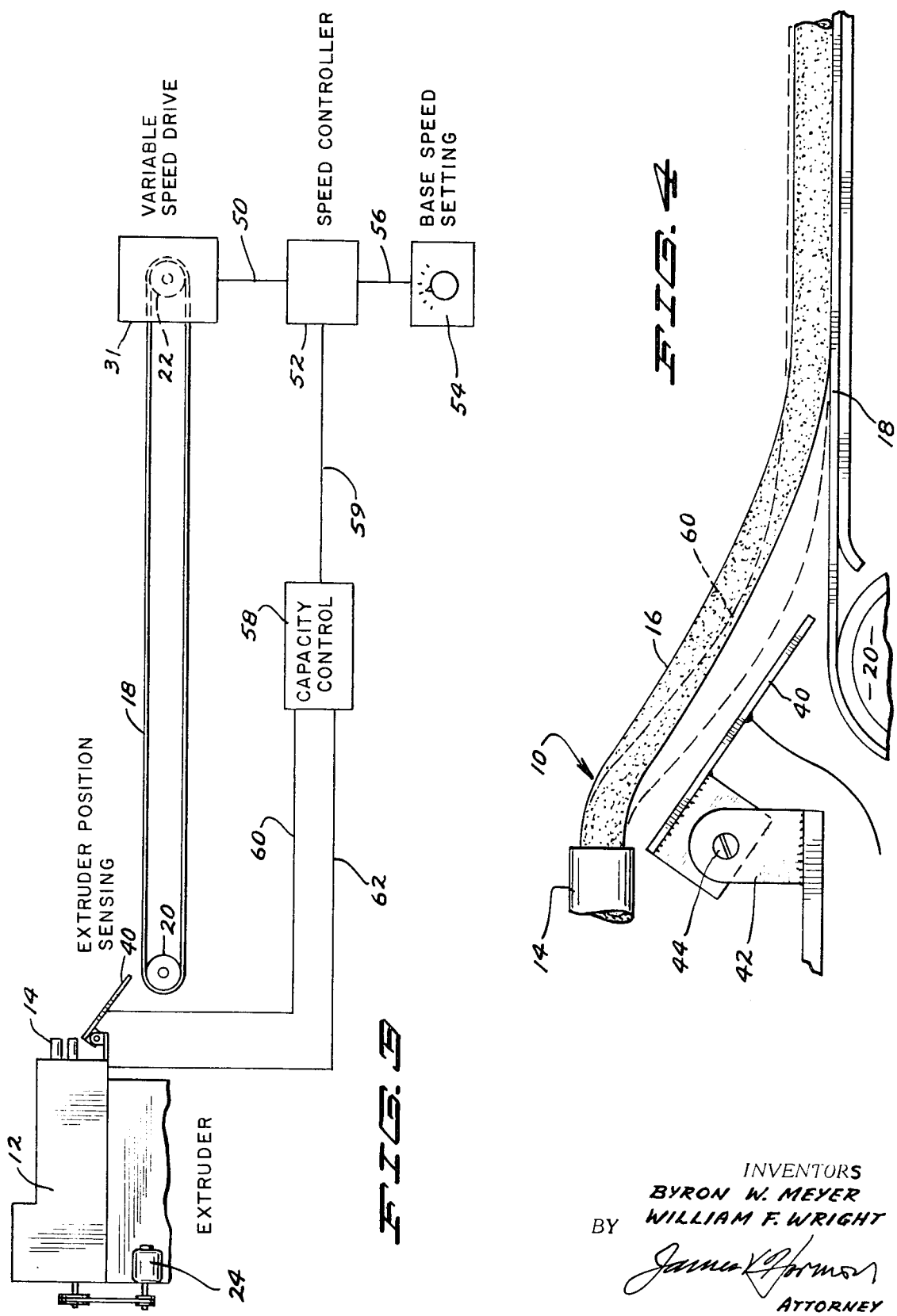

3,676,032
EXTRUSION CONTROL APPARATUS
Byron W. Meyer, Minneapolis, and William F. Wright, St. Paul, Minn., assignors to The Pillsbury Company, Minnneapolis, Minn.
Filed Mar. 9, 1970, Ser. No. 17,389
Int. Cl. A21c 3/04
U.S. Cl. 425—140  4 Claims

ABSTRACT OF THE DISCLOSURE

The diameter of a cylinder of extruded plastic food material is maintained within close tolerances by extruding the cylinder through a nozzle and allowing it to pass from the nozzle a short distance in an unsupported condition to a take-away conveyor which carries the product to a cutter. The extruder from which the material is expelled comprises one plate of a capacitor. The other plate is located in a position spaced from the extruded material. The take-away conveyor is run at a speed from about 2 to 20% faster than the average speed of the material being extruded to impart a controlled degree of stretch in the extruded material. The speed differential is increased when the stretched material droops below a predetermined position and decreased when the extruded food material adjacent the nozzle rises above a predetermined position as sensed by the changes in capacitance between the plates as a result of the change in position of the extruded food material.

---

The present invention relates to an apparatus useful in the production of food products and more particularly to an improved apparatus and method for controlling the dimensions of extruded food products.

In the extrusion of food products, such as candy, nutritive meal replacement bars and the like, the bar must be manufactured to precise tolerances in order for the weight of each bar to be accurately maintained. This is particularly important where the bar is to serve as a nutritionally balanced food to be used as a replacement for an entire meal. It is also important to have each of the extruded ribbons form straight parallel rows.

The output of an extruder is usually a function of such variables as screw r.p.m., material temperature, viscosity, consistency, and pressure. The viscosity alone is often a function of material age and prior handling. In continuous processing it is necessary to synchronize extruder speed to the downstream material handling system.

It was discovered that by employing a noncontacting sensor to determine the distance to which the extrudate hangs down adjacent the extrusion nozzles and by providing controlled stretch of the extruded material responsive to the degree of descension thus measured it is possible to obtain a uniform cross-sectional area and mass for a given composition. While the non-contacting sensor can be of any commercially available type, such as compressed air, a photocell or the like, a capacitive sensor as described hereinbelow is preferred because it provides a high degree of sensitivity, will not move the extruded material, and makes possible a continuous modulated control signal.

In view of the deficiencies of the prior art, the primary object of the invention is the provision of an improved extrusion control having the following characteristics and advantages: (a) the ability to adequately control the cross-sectional area of the material being extruded; (b) the ability to control the dimensions of extruded food products without contacting the surface of the freshly extruded material; (c) a provision for simultaneously controlling the alignment and diameter of an extruded product; and (d) a provision for controlling the diameter of the extruded cylinder by intentionally stretching the product a controlled amount as determined by a noncontacting sensor.

These and other more detailed and specific objects will be apparent in view of the following specification and drawings wherein:

FIG. 1 is a side elevational view of the invention.

FIG. 2 is a vertical sectional view taken on line 2—2 of FIG. 1.

FIG. 3 is a schematic wiring diagram of the invention, and

FIG. 4 is a partial side elevational view of the extruded, material and sensor.

In FIGS. 1 and 4 is shown a plastic food product 10 as it is expelled from a screw extruder 12 through a plurality of nozzles 14 as a series of cylinders 16 onto a horizontally disposed belt conveyor 18 entrained between rolls 20 and 22 (FIG. 3) which carries them from left to right in FIGS. 1 and 3 to a cutter and packaging equipment (not shown). The screw extruder 12 can be of any suitable known construction including an inlet 23 and a drive motor 24 connected to the screw (not shown) through sprockets 26 and 28 and a drive chain 30. The motor 24 drives the extruder 12 at a constant speed so as to expel the extruded cylinders 16 insofar as possible at a constant rate. The take-away conveyor 18 is driven by means of a variable speed drive 31 such as a drive motor connected through a variable speed D.C. motor or other equivalent device such as a continuous infinitely variable speed changer.

Refer now to FIGS. 1, 2 and 3 with reference to non-contacting sensor 40. The sensor 40 comprises a rectangular plate mounted in an inclined position about an inch beneath the extruded cylinders 16 at the point where they bend under their own weight and pass downwardly along an inclined axis as they emerge from the nozzles 14 but before reaching the take-away conveyor 18. The plate 40 is mounted upon a bracket 42 formed from an electrical insulating material and is secured thereto by means of a screw 44 or other suitable adjustable fastener which allows the position of the plate 40 to be changed as desired. The plate 40 should be in a position in which the upper edge is about a quarter inch from the nozzles. The angular position of the plate 40 should be appropriately adjusted so that it is about parallel to the inclined portion of the extruded cylinders before they contact conveyor 18.

The size control of the extruded cylinders 16 will now be described with reference to FIG. 3. As shown in the figure, a variable speed drive 30 is connected by means of conductor 50 to an electrical extruder speed control 52 such as a potentiometer or other suitable means for varying direct current of known construction. If the variable speed drive 30 comprises a variable speed direct current drive motor of the silicon controlled rectifier type such as a 5 HP 2500 r.p.m. continuous duty DC Shunt Wound motor then the extruder speed controller 52 can comprise a solid state type of speed controller such as a silicon controlled rectifier controller, e.g., an Electrostat model 250 manufactured by the Wer Industrial Corporation, Grand Island, Buffalo, N.Y.

A base or initial speed setting is established by means of a speed setting control 54 which can comprise a variable resistance wired to the extruder speed controller 52 by conductor 56. The speed established by the controller 52 is set by a capacity detector circuit 58 connected to the speed controller 52 by conductor 59. The detector 58 provides a variable output responsive to capacitance change. Any suitable known apparatus for measuring capacity between a pair of plates can be employed as the detector 58, e.g., model 408–1000 level control manufactured by the Drexel Brook Engineering Co. of Glenside, Pa. The capacity detector 58 is in turn wired to the noncontacting sensor 40 by a conductor 60 and by conductor 62 to the extruder framework 12 which with sensor 40 functions as plates of a capacitor in which the extruded material 60 acts as a dielectric. Thus, when the extruded cylinders 16 droop closer to the plate 40 than desired (position 60) FIG. 4, the change of capacitance between the extruder framework 12 and plate 40 measured by the capacity detector 58 will cause an increase in the current in conductor 59 thereby increasing the speed of the variable speed drive 30. As the belt 18 begins to move at a faster speed, the extruded cylinders 16 move from the position 60 toward the solid line position of FIG. 4 and as this takes place any tendency for the cylinders 16 to weave from side to side or to form uneven rows will be prevented. Simultaneously, the increased speed of conveyor 18 will cause the extruded cylinders to be stretched. This will maintain the diameter of the cylinders at the desired value.

It was discovered that by employing the noncontacting sensor 40 to determine the distance that the extrudate hangs down adjacent the extrusion nozzles and by maintaining a controlled stretch in the extruded cylinder 18 responsive to the degree of descension thus measured it is possible to obtain a uniform cross-sectional area.

In tests leading to the development of the invention, the depending or hanging portion of the extruded cylinders were first extruded in a relaxed condition. Under these conditions, the diameter of each extruded cylinder is primarily a function of its consistency and temperature, the diameter of each nozzle 14 and the pressure drop through each nozzle. This, it was found, resulted in variation in the diameter of the material. It was then discovered that the diameter could be held to close tolerances by maintaining the extruded material at all times in a state of controlled tension (the solid line position of FIG. 4). This is accomplished by maintaining the speed of conveyor 18 at all times faster than the average velocity of the particles emanating from the nozzle. We have discovered that the food products can be controlled in diameter by maintaining the conveyor speed between about 2 and 20% greater speed than the average velocity of the particles emerging from the nozzle 14 with a speed differential of between about 5 and 10% being preferred.

The operation of the apparatus will now be described. It will be assumed first that the extruder 12 is filled with a plastic food material and the motor 24 is running. The cylinders 16 will then pass from the nozzles 14 onto the conveyor 18 the speed of which is initially set by the base speed setting 54 acting through the extruder speed controller 52 at a rate somewhat faster than the speed of the material issuing from the nozzles. When the degree of stretch of the extruded cylinders 16 is as desired, the cylinders will lie in the solid line position of FIG. 4. If the conveyor 18 is travelling too fast, the cylinders will rise above the solid line position and will become too thin as a result of too much stretching. On the other hand, if the conveyor is travelling too slowly, the extruded cylinders will sag closer to the plate 40, e.g., to the dotted line position 60. This will cause the capacitance between the plate 40 and the extruder 12 to increase. This change will be sensed by the capacity detector 58 which in turn sends a signal to the conveyor speed controller 52 that will cause the drive to speed up sufficiently to return the speed of the conveyor 18 to that required to impart the necessary amount of stretch to the cylinders to return them to the solid line position of FIG. 4. It is important for the operators to keep their hands at least six inches away from the capacitance sensing plate 40 since this can greatly affect the performance of the sensor.

The invention provides many advantages. In a plastic food product in which the specific gravity can be held to relatively close tolerances, it is possible through the use of the invention to control the diameter of the extruded material as a means of controlling the weight of pieces cut at uniform intervals rather than conducting direct weight measurements.

The invention also makes possible the sensing of the product position and the degree to which it is stretched without contacting the extruded material. This is an important advantage, particularly when the material is hot and sticky at the sime that it emerges from the extruder.

It should be obvious to those skilled in the control art that the speed of the conveyor can be held constant and the extruder speed varied by the same method described above to provide the required degree of tension in the extruded material. In any event, it is apparent that by providing a first drive for the extruder and a second drive for the take-away conveyor, the control means 52–54 and sensor 40 will regulate the relative speed of the first and second drives by being connected to either of them.

We claim:

1. An apparatus for controlling the dimensions of extruded plastic food material comprising an extruder having at least one nozzle, a take-away conveyor mounted adjacent to the extruder for receiving the material extruded therefrom, a first drive means for the extruder, a second drive means for the take-away conveyor, a speed controller means connected to one of said drive means for regulating the relative speeds of the first and second drive means, said controller including a noncontacting sensing means positioned in the vicinity of the extruded material expelled from the nozzles before the extruded material passes onto the take-away conveyor, means establishing a base speed for one of said drive means such that the take-away conveyor runs at least two percent faster than the average speed of the material issuing from the nozzle to thereby impart a controlled degree of stretch in the extruded material and said noncontacting sensor causing the speed difference between the first and second drives to increase when the extruded plastic material adjacent to the noncontacting sensor drops below a predetermined position and to decrease the speed difference when the extruded material adjacent the nozzle rises above a predetermined position, said take-away conveyor is spaced from the extruder, said sensor comprises a pair of capacitance plates one of which is the extruder framework and the other of which comprises a plate positioned adjacent to the plastic food material as it is expelled from the nozzle before reaching the take-away conveyor, a means for detecting changes in the capacitance between the plates responsive to changes in the position of the extruded plastic material operatively connected between said sensor and the speed controller.

2. The apparatus of claim 1 wherein the extruder comprises a screw extruder and the take-away conveyor comprises an endless belt conveyor entrained over a pair of longitudinally spaced horizontally disposed rollers and second drive comprises a variable speed drive motor connected to the take-away conveyor.

3. A method for controlling the dimensions of plastic food materials expelled from an extruder having a nozzle onto a take-away conveyor mounted adjacent to the extruder for receiving the material extruded therefrom with a noncontacting sensing means positioned between the nozzle and the take-away conveyor in a position lying in the proximity of the extruded plastic food material expelled from the nozzle; said method comprising establishing a speed differential between the take-away conveyor and the extruder such that the take-away conveyor runs faster than the average speed of the food composition issuing from the nozzle to thereby impart a controlled degree of stretch in the extruded material and said noncontacting sensor controlling the speed differential, said sensor increasing the relative speed of the take-away conveyor when the extruded plastic material adjacent to the noncontacting sensor drops below a predetermined position and said sensor decreasing the speed difference when the extruded material adjacent the nozzle rises above a predetermined position whereby the sensor detects capacitance changes due to the changes in the position of the extruded plastic food material and controls said speed difference thereby.

4. The method of claim 3 wherein the take-away conveyor is spaced from the nozzle and the extruded food material is stretched before reaching the take-away conveyor.

References Cited

UNITED STATES PATENTS

| | | | |
|---|---|---|---|
| 2,303,351 | 12/1942 | Gage et al. | 107—14 |
| 3,415,417 | 12/1968 | Steel | 222—55 |
| 559,323 | 4/1896 | Drake | 107—14 R |
| 3,067,939 | 12/1962 | Ziffer | 222—55 X |
| 2,232,832 | 2/1941 | Walborn | 107—8 R |
| 2,966,253 | 12/1960 | Gerrans | 198—110 |
| 3,177,749 | 4/1965 | Best et al. | 226—118 |
| 2,540,146 | 2/1951 | Stober | 222—52 |
| 2,909,303 | 10/1959 | Henderson et al. | 222—52 |
| 3,149,650 | 9/1954 | Horst | 222—52 |
| 3,494,507 | 2/1970 | Ricciardi | 222—55 |

FOREIGN PATENTS

| | | | |
|---|---|---|---|
| 1,006,187 | 4/1952 | France | 107—14 |
| 1,191,873 | 10/1959 | France | 222—55 |

FRANK L. ABBOTT, Primary Examiner

L. A. BRAUN, Assistant Examiner

U.S. Cl. X.R.

222—52